Jan. 11, 1938.   K. MAYBACH   2,105,429
CLUTCH OPERATING MEANS ON MOTOR VEHICLES
Original Filed Sept. 12, 1933
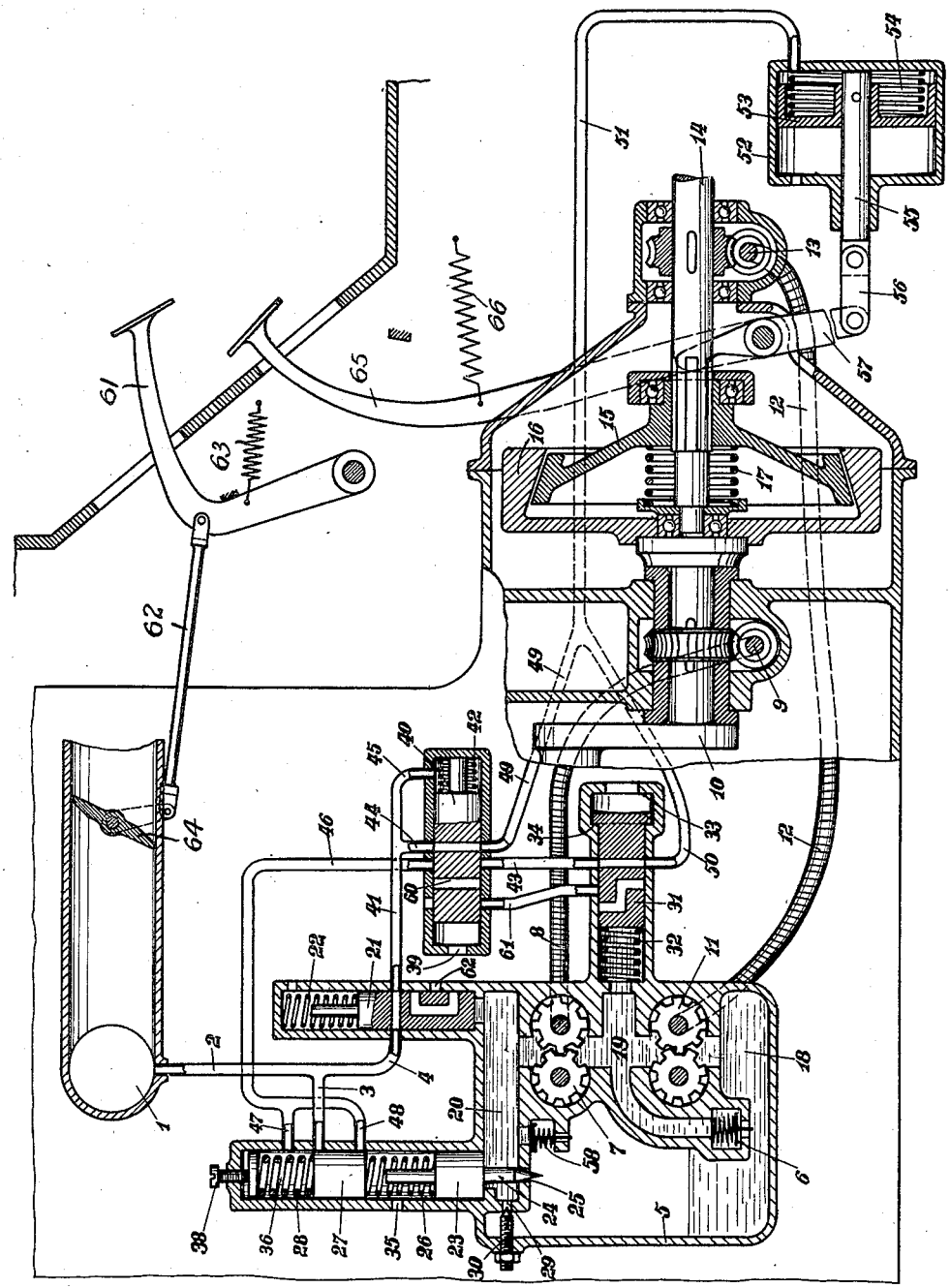
Inventor:
Karl Maybach Patented Jan. 11, 1938

2,105,429

UNITED STATES PATENT OFFICE 2,105,429

CLUTCH OPERATING MEANS ON MOTOR VEHICLES

Karl Maybach, Friedrichshafen, Germany, assignor to Maybach-Motorenbau G. m. b. H., Friedrichshafen, Germany Application September 12, 1933, Serial No. 689,062. Renewed August 19, 1936. In Germany September 24, 1932

18 Claims. (Cl. 192—.01)

My invention relates to clutch operating means on motor vehicles and has special reference to the clutch usually inserted between the motor and the change speed gear.

It has been suggested to provide automatically working clutches for motor cars which at the same time serve for free-wheeling purposes, and which in their working are dependent on the speed of the motor as well as on the speed of the vehicle so that they can be operated by the driver simply by giving gas. Generally there are two speed-responsive devices such as centrifugal pendula and, besides, means may be provided for causing automatic declutching at a certain lowest idling speed which can be set in accordance to the prevailing circumstances and further provided with means preventing reclutching until the parts to be coupled rotate at substantially equal speeds, as disclosed in my co-pending application Serial Number 653,259, filed Jan. 24, 1933.

According to my invention devices of this kind are further improved and developed in such manner that the engagement of the clutch takes place gradually dependent on the prevailing resistance offered to the vehicle and at the same time depending on the way in which the driver gives gas. The movement of the movable clutch member in every phase of the way in which the engagement of the clutch is perfected is automatically adapted to the afore-mentioned two kinds of influence.

The construction according to the invention is such that as soon as the motor exceeds its pre-determined lowest speed a certain force, for example the pressure of a controlled pressure means, acts on the member for engaging the clutch; this force increases in dependency on the resistance offered to the vehicle and on the way in which the driver gives gas; and finally when the two clutch members have reached equal speeds of rotation they come to total engagement under the full clutch pressure independent of the prevailing absolute speed and independent of the partial clutch pressure prevailing just before.

Furthermore, the arrangement according to my invention works in such manner that automatic declutching is prevented until the lowest speed of rotation is reached, at this speed the clutch is held disengaged under the highest possible counter-pressure, and as soon as the speed rises the movable clutch member immediately moves over the entire play between the two clutch members. But these members do not yet come to final engagement, they simply touch each other, and in the degree in which the motor speed increases the clutch pressure increases also. Upon both clutch members having reached equal speed of rotation the variable clutch pressure which was dependent on the motor speed is suddenly and rapidly replaced by the full and constant clutch pressure, for example that of a spring.

At low starting resistance (good and level road) and when the driver requires only slow acceleration, this arrangement will cause engagement of the clutch even at a very small increase of the number of revolutions of the motor beyond the idle run number of revolutions of the motor. On the other hand with the same low starting resistance, but with a required very high acceleration, the number of revolutions of the motor will increase accordingly (for instance up to 500 to 1000 revolutions per minute above the idle run number of revolutions) before the clutch is finally engaged. Finally with the highest starting resistance (exceedingly high climb upon a bad road) a still higher number of revolutions is reached which will adjust itself in accordance with the required starting acceleration (for instance one-half or three-quarters of the maximum number of revolutions of the motor).

The employment of the arrangement according to the invention affords particular advantages in connection with such gear controlling devices which on changing do no longer require the clutch to be operated, in which for instance automatic disengaging of the coupling upon stopping the gas supply and if desired also a free run device is provided posterior to the gear, or with gears the wheels of which are operated by change clutches without middle idle position of the control sleeve. In such arrangements, the operating lever of the clutch can be omitted by the employment of an arrangement according to the invention, as the operation of the clutch will then no longer be required even for its ultimate purpose namely the starting under the most difficult conditions.

A further advantage of the arrangement according to the invention consists in that the otherwise extremely difficult starting upon inclined roads will be substantially facilitated as there will be no need to operate a clutch lever. The driver operates with one foot the brake pedal and with the other foot the gas accelerator. In proportion as the number of revolutions of the motor increases and the clutch is more strongly pressed, the brake pedal may be released.

The driver can therefore by operating these two levers start the vehicle from standstill even on the steepest inclines, whereas it was hitherto extremely difficult and often almost impossible owing to the necessity of simultaneously operating the clutch pedal and the accelerator by the two feet and moreover operating the hand brake, to start a vehicle upon an incline without backward running of the vehicle occurring, which is extremely dangerous in mountainous countries. For this reason arrangements have been provided for preventing such a running back. Such special arrangements are with the arrangement according to the present invention likewise no longer necessary.

The invention is applicable to any kind of power driven vehicle, not only cars for the conveyance of persons, omnibuses and power driven vehicles for the conveyance of loads, but also to railroad vehicles with motor drive. With the latter kind of power driven vehicles, the arrangement according to the invention is important inasmuch as with such vehicles the driver often has his position at such distance from the engine plant that he cannot judge and accordingly tune the engaging operation according to the noise of the motor.

A constructional example is shown diagrammatically in the drawing, mostly in section. Sub-atmospheric pressure is assumed to be the pressure means for actuating the disengaging and engaging device of the clutch.

1 denotes a container from which supply of sub-atmospheric pressure to the device takes place and which may be connected to the intake manifold of the motor. From the container leads a conduit 2 with branches 3 and 4 to the control members. 7 is fluid pump driven from the crank shaft 10 by means of a flexible shaft 8 and worm drive 9. 11 is a second fluid pump which is driven from the shaft 14 of the clutch part 15 (car driving shaft) by means of a flexible shaft 12 and worm drive 13. The fly wheel 16 of the motor constitutes at the same time the other clutch half. The clutch is maintained during the run of the car in the engaged position by the spring 17.

In the casing 5 of the fluid pumps, 18 is a suction space from which the pump 11 driven by the car draws the fluid. 19 is the fluid space located between the two pumps. 6 is a spring loaded suction valve which opens at the greatest permitted sub-atmospheric pressure in the space 19. 20 is the space into which the motor driven pump 7 delivers. 58 is an overpressure valve which prevents a predetermined maximum pressure in the space 20 from being exceeded. In this space there is a slide valve 21 which is loaded by a spring 22 as well as a piston 23, the needle-shaped extension 24 of which controls at its lower end the delivery through the opening 25. Above the piston 23 there is a spring 26 and a control slide valve 27, which latter is loaded by a spring 28, the pressure of the spring being adapted to be adjusted by the screw 38. 35 is a vent opening. From the space 20 the fluid may also escape through the opening 29 the free cross section of which may be adjusted by the screw 30.

The fluid in the space 19 located between the two pumps can act upon a slide valve 31 which is loaded by a spring 32, the two end positions of the slide valve being determined by the stops 33 and 34.

The slide valve 40 is loaded by a spring 42 and is connected by the conduits 61 and 43 with the casing of the slide valve 31, by the conduits 44 and 45 which are connected to the conduit 41, to the casing of the slide valve 21, and by the conduit 46 and its branches 47 and 48 with the casing of the slide valve 27. At the left end of the casing of the slide valve 40 there is a vent opening 39. From the casings of the slide valves 40 and 31 conduits 49 and 50 lead to a conduit 51, the latter opening into the cylinder 52 of the actuating device of the clutch. In the actuating device a piston 53 is loaded by a spring 54, and acts by means of a rod 55, a link 56 and a two-armed lever 57 upon the movable part 15 of the clutch.

The accelerator pedal 61 is connected to the throttle valve 64 by means of rod 62, and return spring 63 is adapted to move pedal 61 back into the position represented after it had been depressed and released again. Clutch pedal 65 is provided with the return spring 66.

The mode of operation of the device is as follows:

As long as the vehicle stands still and before the motor is started there is atmospheric pressure in the motor intake 1 and also in the conduits 2, 3 and 4. And as pump 7 is not working space 20 contains atmospheric pressure and piston 23 is in its lowest position, as represented. Slide valve 27 by means of springs 26 and 28, acting against each other, is held in a position just a little lower than represented so that space 36 is in connection with conduit 3. The slide valve 27 possesses both at the top and at the bottom one controlling edge portion each. The upper control edge controls the passage to the conduit 3 which through the conduit 2 leads to the intake manifold 1, whilst the lower control edge controls the entry of the outer air into the passage 48.

As there is no pressure in space 20 slide valve 21 is in its lowest position, as represented in the figure, connecting conduit 4 with conduit 41. Slide valve 40 at its right hand end being under atmospheric pressure through conduits 41 and 45 is in its left hand position owing to the pressure of spring 42, in which position conduits 46 and 43 are connected with one another, whereas conduit 61 is connected to the atmosphere. Slide valve 31 because of the pressure from spring 32 is in its right hand position in which conduits 51 and 50 are connected to conduit 61 and to the atmosphere by means of channel 60 in slide valve 40. Consequently, there is atmospheric pressure in the space of cylinder 52 which is to the right of piston 53 so that this piston is in its left hand position owing to the pressure of spring 54. In this position of piston 53 clutch members 15 and 16 are engaged.

Conduit 46 is in connection with conduit 43, but slide valve 31 being in its right hand position closes this conduit. Conduits 44 and 49 are not connected because slide valve 40 is in its left hand position.

Before starting the driver disconnects the clutch members 15 and 16 by means of the ordinary clutch pedal 65 and then he starts the motor which runs at its lowest idling speed and creates a sub-atmospheric pressure in the intake manifold 1. The sub-atmospheric pressure can therefore pass from the container 1 through the conduits 2 and 4, the slide valve 21 and the conduits 41 and 45, behind the right hand side of the slide valve 40, whereby the latter is pulled against the action of the spring 42 into its right hand end position (as illustrated). The conduit 44 which branches off the conduit 41 is thereby connected with the conduit 49. The full sub-atmospheric pressure acting at the idle run number of revolutions, passes therefore along the path through the conduit 51, which connects the conduit 49 with the clutch operating cylinder 52, behind the piston 53 of the disengaging device, and the clutch is completely disengaged with the maximum force.

Before dealing with the further operations occurring during starting, the mode of operation of the pressure regulating member 27 will be first described. At the fluid pressure corresponding to the idle run number of revolutions, the piston 23 is in its lowest position and the spring 26 is entirely or nearly without tension. The slide valve 27 possesses both at the top and at the bottom one controlling edge portion each. The upper control edge controls the passage to the conduit 3 which through the conduit 2 leads to the sub-atmospheric pressure container 1, whilst the lower control edge controls the entry of outer air into the passage 48. By the action of the two control edges there will be produced in the space 36 above the slide valve 27 and in the adjacent conduits a sub-atmospheric pressure which is lower than that in the container 1 and depends upon the tension of the spring 28. By altering the tension of the spring 28 by means of the regulating screw 38 the magnitude of the effective sub-atmospheric pressure may be varied. When starting space 36 is connected to the intake manifold 1 by means of conduits 2 and 3, as explained above, the sub-atmospheric pressure then prevailing in the manifold 1 causes a sub-atmospheric pressure in space 36 also, and consequently slide valve 27 moves upward into the middle position, as represented in the drawing, so that valve 27 closes both conduits, 48 as well as 3, which means that in this state the weight of valve 27, the pressure of springs 26 and 28 and the sub-atmospheric pressure within space 36 are in equilibrium. Upon increase of the number of revolutions of the motor, therefore upon increase of the fluid pressure in the space 20, the piston 23 will be moved upwards and the spring 26 will be more tensioned. The piston 27 will under the increased pressure of the spring 26 perform a small movement upwards. By this movement and through admission of air at the lower control edge of the slide valve 27 into conduits 48, 47, 46 and also into the space 36 above the slide valve 27, the previously existing sub-atmospheric pressure will be slightly reduced in accordance with the alteration of the number of revolutions. An increase of pressure will therefore have occurred in the space 36, which will cause the slide valve 27 to move somewhat downwards so as to close again the conduit 48. The three forces acting upon the slide valve 27: spring 26, the action of the reduced sub-atmospheric pressure, and spring 28 are now again balancing each other. The control movements of the slide valve 27 are, of course, only of a very small size (tenths of a millimetre both upwards and downwards).

During further increase of the number of revolutions and consequent increase of the fluid pressure in the space 20, the above-described to-and-fro movement is repeated so that a variable sub-atmospheric pressure depending as regards its magnitude upon the number of revolutions of the motor will automatically be produced in the space 36 and in the conduits communicating therewith.

During starting, only the number of revolutions of the motor is increased by the driver. Even after a small increase of the number of revolutions of the motor above the idle run number of revolutions (for instance an increase of 20 to 30 revolutions per minute) the slide valve 21 will reach its upper end position in which the conduit 4 extending from the sub-atmospheric pressure container is closed, and the conduit 41 is connected with the vent opening 62. By this means, air passes through the conduit 45 behind the right hand end of the slide valve 40, whereby the latter moves under the action of the spring 42 into the left hand end position and closes the passage from the conduit 44 to the conduits 49 and 51 and the clutch operating cylinder 52. At the same time and in this position of the slide valve 40, the passage from the conduit 46 to the conduit 43 is opened.

As the fluid pump 11 driven by the vehicle is standing still, sub-atmospheric pressure is produced in the space 19 by the fluid pump 7 driven by the motor. Consequently the slide valve 31 is in its left hand end position (as illustrated). The passage from the conduit 43 to the conduit 50 and consequently also via conduit 51 to the clutch operating cylinder is opened. The sub-atmospheric pressure regulated as regards its value by the slide valve 27, will therefore upon the idle run number of revolutions of the motor being slightly exceeded, act with its maximum set value upon the piston 53 of the disengaging device, via conduits 47, 46, slide valve 40, conduit 43, slide valve 31, conduits 50, 51, and the previously active full suction sub-atmospheric pressure of the motor will be instantaneously replaced by this maximum value of the reduced sub-atmospheric pressure at the mentioned small increase (of 20 to 30 revolutions per minute) above the idle run number of revolutions, as the slide valve 40 suddenly renders free the passage to the conduits 46 and 43 and consequently enables the reduced sub-atmospheric pressure to come into action. By this means the piston 53 of the disengaging and engaging device and the movable clutch part 15 will instantaneously travel the release stroke from the fully disengaged position to that position in which the clutch parts just contact with each other lightly without proper carrying force.

According to the number of revolutions of the motor set by the driver by means of the gas lever, the number of revolutions of the pump 7 and consequently the fluid pressure in the space 20 will increase. Consequently the piston 23 will move accordingly upwards and will by compressing the spring 26 act upon the slide valve 27. The effective sub-atmospheric pressure will therefore be altered by the slide valve 27 in dependence of the number of revolutions of the motor, the slide valve 27 being moved forwards and backwards, and the varied sub-atmospheric pressure will act upon the piston 53 of the disengaging device along the described path. The clutch parts will therefore upon the number of revolutions of the motor increasing, be pressed against each other more strongly, in accordance with the decrease of the effective sub-atmospheric pressure, that is the number of revolutions of the motor set by the driver.

As soon as the number of revolutions is so high that the produced pressure between the parts is sufficient for transmitting the turning moment required for overcoming the starting resistance and for producing the desired acceleration, the clutch part 15 will be frictionally carried, slipping occurring in the clutch, and the vehicle will commence starting.

As soon as subsequently the two clutch parts reach the same number of revolutions, and consequently the two fluid pumps 7 and 11 run with the same number of revolutions, the sub-atmospheric pressure of the fluid which previously existed in the space 19 between the two pumps will disappear. Consequently the slide valve 31 will, under the pressure of the spring 32, be moved into its right hand position, the passage to the conduit 43 and so on to the space 36 above the slide valve 27 will be closed, and instead the connection of the conduit 50 and consequently the cylinder of the disengaging and engaging device with the outer air will be established via conduit 61 and the bore 60 of the slide valve 40. Whereas, therefore, before the synchronous run, there was a pressure to engage the clutch which corresponded to the effective sub-atmospheric pressure dependent upon the number of revolutions of the motor at the time being, the clutch is now pressed into engagement with the full force of the spring 17, without any counteracting force of sub-atmospheric pressure, and consequently the clutch will become firmly engaged.

If during further operation, the number of revolutions of the motor is increased or reduced, this will have no influence upon the clutch, as the slide valve 31 will remain in its right hand end position and the clutch engaging cylinder will be permanently connected to air. Only when the speed of the vehicle is dropped to a speed corresponding to the lowest idle run number of revolutions of the motor, will the slide valve 21 under the action of the spring 22 move into its lower end position owing to the action of the fluid pressure in the space 20 which is dropped to its lowest value, and will disengage in the above-described manner the clutch with the full sub-atmospheric pressure of the motor. If the vehicle is stopped, starting may be effected again in the above-described manner. If the vehicle runs on without stopping, the clutch will be maintained in its disengaged position until the number of revolutions of the motor is again increased. Upon the number of revolutions being slightly increased above the idle run number of revolutions of the motor, the slide valve 21 will again move into its upper position and consequently the slide valve 40 will again move into its left end position and the clutch operating cylinder will in the above-described manner finally be connected to air.

Engagement of the clutch takes place always upon synchronous running of the clutch parts and at various numbers of revolutions depending upon starting conditions, without being directly dependent of the position of the gas lever.

Apart from this arrangement which for the sake of clarity has been kept purely diagrammatic and simple, other arrangements may be obviously chosen within the scope of the invention and without changing the essence of the invention.

The slide valve movements and cross sections given in the drawing, are shown in a purely diagrammatic manner. They are in carrying out the invention so chosen as to attain high sensitiveness, and accurate and rapid action of the controlling operations.

I do not want to be limited to the details described or shown in the drawing, as many variations will occur to those skilled in the art.

What I claim is:

1. On a motor driven vehicle in combination: a first clutch member in driving connection with the motor and a second clutch member in driving connection with the wheels of said vehicle; pressure means adapted to cause engagement and disengagement of said clutch members; a first valve for controlling said pressure means in direct dependency on the speed of rotation of said motor; and a second valve for controlling said pressure means in dependency both on the speed of rotation of said motor and on the speed of rotation of said second clutch member.

2. On a motor driven vehicle in combination: a first clutch member in driving connection with the motor and a second clutch member in driving connection with the wheels of said vehicle; pressure means adapted to cause engagement and disengagement of said clutch members; a first valve for controlling said pressure means in direct dependency on the speed of rotation of said motor; a second valve for controlling said pressure means in dependency both on the speed of rotation of said motor and on the speed of rotation of said second clutch member; and means for controlling said pressure means being adapted to cause disengagement of said clutch members when the motor speed is reduced to its idling speed.

3. A combination as claimed in claim 1 further including means for causing the pressure means controlled by said first controlling valve to re-act on said first valve.

4. A combination as claimed in claim 2 further including means for causing the pressure means controlled by said first controlling valve re-act on said first valve.

5. On a motor driven vehicle in combination: a clutch having a clutch member in driving connection with the motor and a clutch member in driving connection with the wheels of said vehicle; pressure means for engaging and disengaging said two clutch members, said pressure means comprising: a first fluid pressure system adapted to cause regulated pressure to act on said clutch and a second fluid pressure system adapted to cause disengagement and full engagement of said clutch, alternately, said second system having two branches; a first valve in said first system for controlling the pressure in dependency on the speed of rotation of said motor; a second valve in said first system and in one branch of said second system for controlling the pressure in dependency both on the speed of said motor and on the speed of said vehicle and for alternately connecting said first system and one of the branches of said second system to said clutch; means for controlling said pressure in dependency on the speed of the motor so as to cause disengagement of said clutch when the motor speed is reduced to its idling speed; and means in both said first system and in the two branches of said second system for alternately connecting said first system and one of the branches of said second system to said clutch.

6. On a motor driven vehicle in combination: a clutch having a clutch member in driving connection with the motor and a clutch member in driving connection with the wheels of said vehicle; pressure means for engaging and disengaging said two clutch members; said pressure means comprising: a first fluid pressure system adapted to cause regulated pressure to act on said clutch and a second fluid pressure system adapted to cause alternately full pressure and no pressure to act on said clutch and thereby to cause full engagement or disengagement of said clutch, alternately, said second system having two branches; a first valve in said first system for controlling the pressure in dependency on the speed of rotation of said motor; a second valve in said first and in one branch of said second system for controlling the pressure in dependency both on the speed of said motor and on the speed of said vehicle and for alternately connecting said first system or one of the branches of said second system to said clutch; a third valve in said second fluid pressure system controlling the pressure in dependency on the speed of the motor so as to cause disengagement of said clutch when the motor speed is reduced to its idling speed; and a fourth valve in both said first system and in the two branches of said second system for alternately connecting said first system and one of the branches of said second system to said clutch.

7. A combination as claimed in claim 6 further including the feature that said fourth valve is controlled by said third valve.

8. A combination as claimed in claim 1 further including: a first fluid pressure causing device driven by said motor and a second fluid pressure causing device driven in dependency on the speed of the wheels of said vehicle; said first device being adapted to act on said first valve and both said devices being adapted to act on said second valve.

9. A combination as claimed in claim 2 further including: a first fluid pressure causing device driven by said motor and a second fluid pressure causing device driven in dependency on the speed of the wheels of said vehicle; said first device being adapted to act on said first valve and both said devices being adapted to act on said second valve.

10. A combination as claimed in claim 5 further including: a first fluid pressure causing device driven by said motor and a second fluid pressure causing device driven in dependency on the speed of the wheels of said vehicle; said first device being adapted to act on said first valve and both said devices being adapted to act on said second valve.

11. On a motor vehicle in combination: a clutch having a clutch member in driving connection with the motor and a clutch member in driving connection with the wheels of said vehicle; pressure means for engaging and disengaging said two clutch members, said pressure means comprising: a first fluid pressure system adapted to cause regulated pressure to act on said clutch and a second fluid pressure system adapted to cause the full pressure to act on said clutch, said second system having two branches; a first valve in said first system for regulating the pressure and being itself under the influence of the regulated pressure; a second valve in said first system for controlling alternately the regulated pressure and the pressure for full engagement of said clutch in dependency both on the speed of said motor and the speed of said vehicle; a third valve in one of said branches of said second fluid pressure system for controlling the full pressure so as to cause disengagement of said clutch when the motor speed is reduced to the idling speed; a fourth valve in both said systems for alternately connecting one of said systems to said clutch, said fourth valve being controlled by said third valve.

12. A combination as claimed in claim 11 further including: a first liquid pressure pump driven by said motor and a second liquid pressure pump driven in dependency on the speed of the wheels of said vehicle; said first pump being adapted to act on said first valve and on said third valve, both said pumps being adapted to act on said second valve.

13. On a motor driven vehicle in combination, a clutch member in driving connection with the motor and a clutch member in driving connection with the wheels of the vehicle, pressure means for engaging and disengaging said clutch members, said pressure means comprising a first fluid pressure system adapted to cause regulated pressure to engage the clutch, valve means in said first system responsive to the speed of the engine and adapted to regulate the pressure in said first system, a second fluid pressure system adapted to cause disengagement of the clutch, and control means for alternately connecting the first system and the second system to the clutch.

14. On a motor driven vehicle in combination, a clutch member in driving connection with the motor and a clutch member in driving connection with the wheels of the vehicle, pressure means for engaging and disengaging said clutch members, said pressure means comprising a first fluid pressure system adapted to cause regulated pressure to engage the clutch, valve means in said first system responsive to the speed of the engine and adapted to regulate the pressure in said first system, a second fluid pressure system adapted to cause disengagement of the clutch, and means operating alternately to connect the first system to the clutch when the motor begins to exceed idling speed and to connect the second system to the clutch when the motor slows down to idling speed.

15. On a motor driven vehicle in combination, a clutch member in driving connection with the motor and a clutch member in driving connection with the wheels of the vehicle, pressure means for engaging and disengaging said clutch members, said pressure means comprising a first fluid pressure system adapted to cause regulated pressure to engage the clutch, valve means in said first system responsive to the speed of the engine and adapted to regulate the pressure in said first system, a second fluid pressure system adapted to cause disengagement of the clutch, means adapted to render the second system inoperative to disengage the clutch when the motor exceeds idling speed, and shift means actuatable by said last-mentioned means to alternately connect the first system and the second system to the clutch.

16. On a motor driven vehicle, in combination, a first clutch member in driving connection with the motor and a second clutch member in driving connection with the wheels of the vehicle, fluid pressure means adapted to cause engagement and disengagement of said clutch members, control means for the pressure means responsive to the speed of the motor and selectively operative to cause the pressure means to engage the clutch when the motor exceeds idling speed and to cause the pressure means to disengage the clutch when the motor is at idling speed, and pressure regulating means for the pressure means responsive to the speed of the motor and becoming operative when the motor exceeds idling speed to cause regulated pressure to engage the clutch.

17. On a motor driven vehicle, in combination, a first clutch member in driving connection with the motor and a second clutch member in driving connection with the wheels of the vehicle, and clutch actuating pressure means operative to effect complete and immediate disengagement of the clutch when the motor drops to a predetermined low speed and operative above said predetermined low speed to effect re-engagement of the clutch, and pressure regulating means operating in dependency on the speed of the motor above the predetermined low speed to cause the clutch actuating means to effect partial re-engagement and then complete re-engagement of the clutch.

18. On a motor driven vehicle, in combination, a first clutch member in driving connection with the motor and a second clutch member in driving connection with the wheels of the vehicle, automatic clutch actuating means operating when the motor drops to a predetermined low speed to effect disengagement of the clutch and operating when the motor exceeds said predetermined low speed to effect engagement of the clutch, and regulating means for the clutch actuating means operating in dependency both on the speed of the motor above said predetermined low speed and the speed of the second clutch member to cause the clutch actuating means to effect gradual re-engagement of the clutch.

KARL MAYBACH.